United States Patent

[11] 3,600,674

[72] Inventors Frederick Alexander Roberts
 Brea;
 Edwin B. Saunders, Whittier, both of, Calif.
[21] Appl. No. 812,676
[22] Filed Apr. 2, 1969
[45] Patented Aug. 17, 1971
[73] Assignee Chevron Research Company
 San Francisco, Calif.

[54] METHOD OF DETERMINING LEAKS FROM BURIED PIPELINES USING A TIME-SHARING TRANSMISSION LINE
 9 Claims, 7 Drawing Figs.

[52] U.S. Cl. .................................................. 324/52,
 73/40.5 R, 174/11 R, 340/242
[51] Int. Cl. ........................................................ G01r 31/11,
 G01m 3/16
[50] Field of Search ...................................... 324/52, 66;
 340/235, 242; 333/95, 96; 174/11; 73/40.5

[56] References Cited
 UNITED STATES PATENTS
2,056,085  9/1936  Alles .......................... 340/235 X
2,387,783 10/1945  Tawney ....................... 333/96 X
2,759,175  8/1956  Spalding ..................... 340/235 X
2,794,071  5/1957  Hughes et al. ............... 324/52 X
2,843,668  7/1958  Ilgenfritz .................... 324/52 X
3,195,079  7/1965  Burton et al. ................ 333/95
3,205,462  9/1965  Meinke ....................... 333/95
3,345,450 10/1967  Spindle ....................... 333/96 X
3,382,493  5/1968  Loper et al. ................. 340/235 X
3,485,085 12/1969  Hawkins ..................... 73/40.5 X
3,510,762  5/1970  Leslie ......................... 324/52

Primary Examiner—Gerard R. Strecker
Attorneys—A. L. Snow, F. E. Johnston, R. L. Freeland, Jr. and Harold D. Messner ABSTRACT: A method of determining leakage from a buried pipeline using a closed-loop radar system having time-sharing transmission line buried adjacent to the pipeline to be monitored.

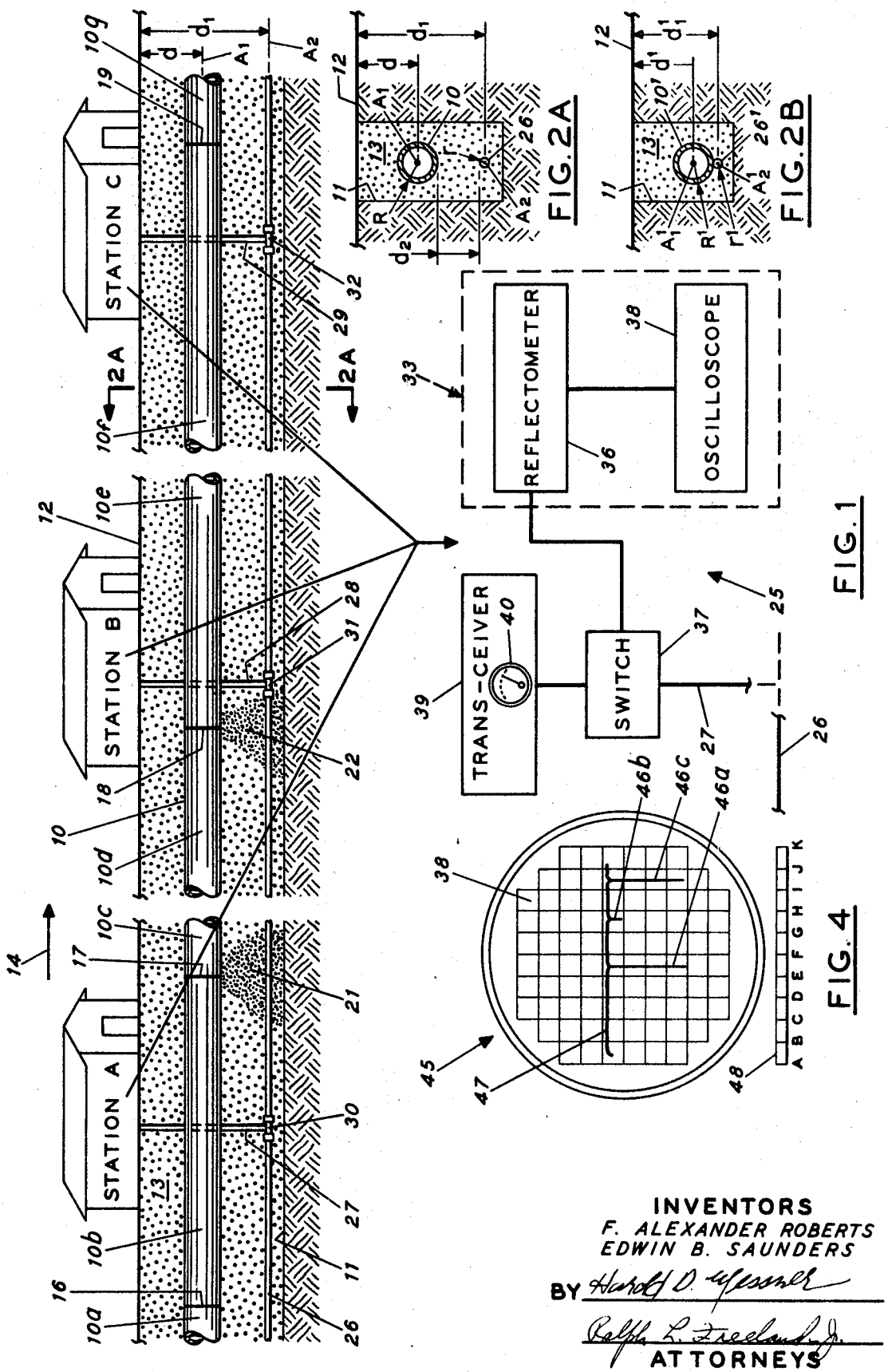

PATENTED AUG 17 1971 3,600,674
SHEET 2 OF 2
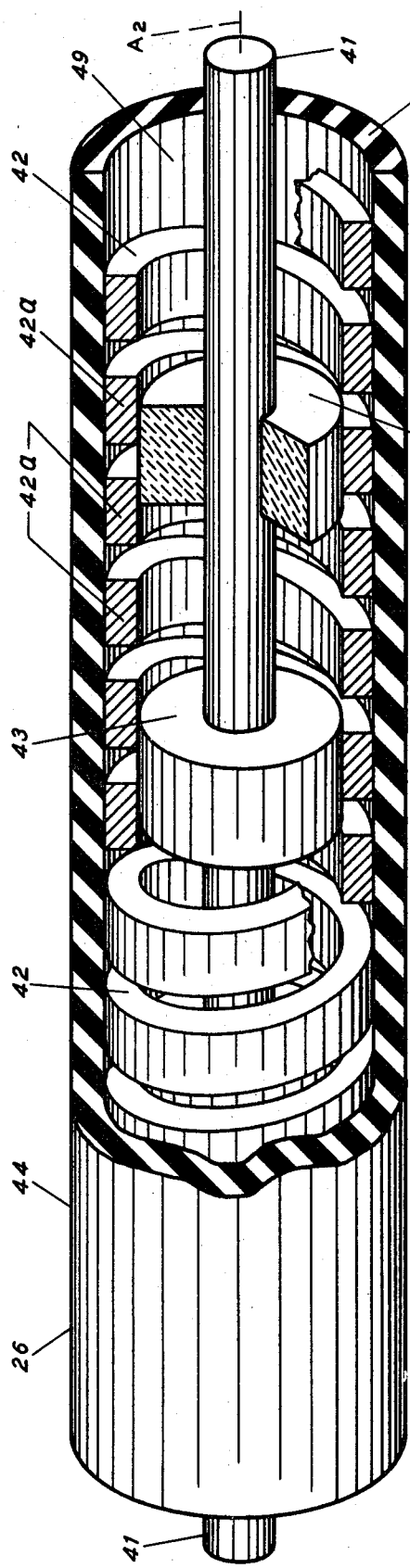
FIG. 3
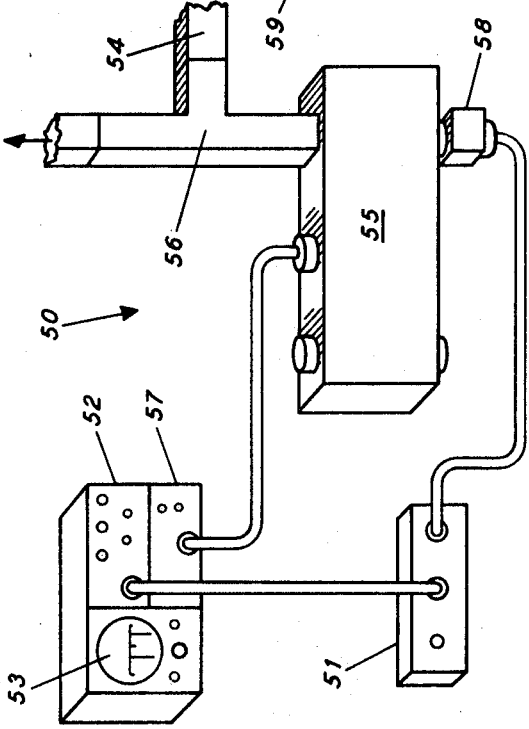
FIG. 6
FIG. 5
INVENTORS
F. ALEXANDER ROBERTS
EDWIN B. SAUNDERS
BY *Harold L. Stowell*
*Ralph L. Freeland, Jr.*
ATTORNEYS

METHOD OF DETERMINING LEAKS FROM BURIED PIPELINES USING A TIME-SHARING TRANSMISSION LINE

This invention relates to a method of determining the location of leakage from a buried pipeline irrespective of whether or not the pipe is capable of conducting an electric current or magnetic flux and pertains more specifically to detecting and recording leakage from buried pipes (which, in addition to being inaccessible from outside of the pipe wall, may also carry nonaqueous, hostile liquids that render testing from inside the pipe undesirable) by use of a closed-loop radar system including a time-sharing transmission line buried adjacent to the pipeline to e monitored. The invention has special utility in monitoring pipeline activities carried out in the permafrost zones of the world such as Alaska and Canada. (permafrost regions are defined as the perennially frozen layers of earth formation which have remained below 0° C. for many years.)

Pipelines, and particularly buried pipelines associated with conveyance of petroleum products, undergo corrosion. Heretofore it has been normal in monitoring buried pipelines to wait until leaks have actually occurred before the pipeline is serviced. For example, as these leaks manifest themselves as seepage at the earth's surface an inspector can detect them and initiate action for replacement of the corroded pipeline. However, it is evident that there is a time lag between the actual emission of the liquid from the pipes and its appearance at the earth's surface. The time required for the liquid to flow to the earth's surface may be quite long depending on the stratigraphy of the earth in the region where the leak occurs. Accordingly, large amounts of liquid may be lost before the leak can be actually detected and the pipeline repaired. Further, the time lag between emission of the liquid and its appearance at the earth's surface may create substantial health and pollution hazards.

With respect to buried pipelines, visual inspection is, of course, not possible. Attempts in the prior art to inspect buried pipelines using remotely situated electric, magnetic or radioactive inspection systems, have been unsatisfactory due, primarily, to their inability to provide an accurate and rapid indication of the location of flaws, especially with respect to known geographical points. Where the piping structure is buried, the earth itself exerts a shielding effect. Conventional inspection systems are not only affected by varying soil conditions adjacent to the pipeline that is monitored, but also the presence of plant life or the use of manmade protective surface barriers, such as pavement, also contribute adversely to the detection of flaws within buried pipelines. Further, in many cases it is not practical to reduce the shielding effect of the earth by boring large numbers of test holes along sections of the pipeline.

Where the buried pipeline is coated with a protective layer of plastics material or the like to prevent corrosion, the shielding effect of the earth on conventional audio detection systems may be even more pronounced. In audio detection systems, after the coated pipe has been placed in a trench and covered with soil, a characteristic audio signal developed along the pipe is monitored by an operator walking along the earth above the pipeline. As a flaw in the pipeline is approached, the operator detects a variation in signal strength. A successful detection system should be capable of rapidly and accurately inspecting relatively long lengths of pipe for flaws, however, and provide an accurate record of the flaws by means of a record which can provide accurate correlation with the actual pipeline. A successful system should also have time-sharing capabilities with other functional equipment since use of the detection system is usual on a periodic (say weekly) operational basis. This is especially true where the pumping and discharge terminals of the pipeline to be monitored are separated by long distances of permanently frozen land areas such as found in northern regions of Alaska and Canada In such environments the remoteness of the oil-producing sites from the discharge terminal, the extremely low temperatures, and the varying atmospheric conditions, dictate that a direct-linked communication system, in addition to the usual radio systems, is highly desirable.

In accordance with the present invention, a rapid and accurate method of inspecting buried pipelines (coated or otherwise) for flaws and locating locations of leakage of liquid from the pipeline is achieved by the provision of a closed-loop radar system including a time-sharing coaxial transmission line buried in an adjacent location to the pipeline to be monitored. The present invention contemplates that before the pipeline (coated or otherwise) is placed within a trench, or buried at the surface of the earth, the coaxial transmission line is buried at a depth below the pipeline. Vertical spacing therebetween, if any, remains substantially constant along the pipeline/transmission line link. Preferably the coaxial transmission line and the pipeline are buries so that as the pipeline develops flaws, the liquid leaking from the pipeline quickly seeps into contact with the outer cover of the transmission line. The outer covering of the coaxial transmission line is formed of a material that can be easily penetrated by the liquid being transported within the pipeline. Thus, if oil or petroleum products are carried in the pipeline, the outer covering of the coaxial line can be formed of asphalt materials, wax-based compositions, rubber-based (oil-soluble) compositions or synthetic (oil-soluble) polymers. After the coaxial transmission line and the pipeline have been buried, the conductors of the transmission line are connected to a reflectometer at the earth's surface, as through a vertically extending trunkline. The reflector is conventional in design and detects discontinuities in the coaxial transmission line due to the intrusion of pipeline liquids. The reflectometer, say operating in the time domain mode, includes a pulse generator triggered by means of a synchronizing signal from a conventional time base connected to, in turn, and triggering a sampling oscilloscope. A pulse of electromagnetic energy is driven through a conventional sampler into the buried coaxial transmission line and propagates along that line adjacent to the buried pipeline. As the energy strikes discontinuities along the transmission line (marking intrusions of liquid), the signals are reflected back to the reflectometer through the sampler to the oscilloscope. Resulting reflections are displayed on the oscilloscope as an amplitude-versus-time oscillogram. The vertical channel of the oscilloscope is calibrated in terms of reflection coefficients, the threshold level being established to detect intrusions into the transmission line of the liquid of the pipeline. If the liquid within the pipeline is an oil or petroleum byproduct, intrusions create high impedance mismatches along the line so that rather high reflection coefficients will be indicated at the display of the oscilloscope. Accordingly, the threshold level, in such applications, of the oscilloscope can be set at a rather high level. Further, rather large lengths of pipeline can e read directly on the horizontal axis of the oscillogram, and correlation of the oscillogram with the actual pipeline is quite easily achieved. A camera may be employed to photograph the oscillogram to provide a permanent record.

The present invention also contemplates that the buried coaxial transmission line will have a time-sharing capability with conventional line linked communication systems, these systems coupling, on communication, two or more stations along the pipeline—transmission line link. For example, at one of these stations the reflectometer can be connected in parallel with a conventional communication system through a multiple-contact microwave switch. Accordingly, when the transmission line is not being used in the inspection-detection mode, i.e., with the reflectometer system, the communication system can be connected in series therewith and provide a direct line communication link between two or more stations. Such communication systems are also capable of detecting the deterioration in signal strength (as by monitoring signal level) so as to provide initial indication of increase in reflection coefficients along the transmission line due to liquid seepage therein, as from the pipeline. When deterioration in signal strength occurs, the operator is put on notice of the possibility that leakage from the pipeline has occurred. He can then place in operation the reflectometer system so that any leakage of liquid from the pipeline can be determined and the location pinpointed.

It is an object of the present invention to provide a method for determining leaks along a pipeline utilizing an electromagnetic reflectometer system including a time-sharing transmission line positioned immediately adjacent to the pipeline and being selectively capable of indicating, as reflection discontinuities, intrusions of liquid seeping therein from the adjacent pipeline, the transmission line also having time-sharing capabilities to provide a conventional direct-linking transmission line for a communication system coupling two or more stations along the transmission line/pipeline link.

Other objects and advantages of the present invention will be readily apparent from the following detailed description of a preferred embodiment taken in conjunction with the attached drawings in which:

FIG. 1 is a partial section of the near surface of an earth formation in which a pipeline has been buried illustrating an electromagnetic leak detection/communication system of the present invention;

FIG. 2a is a section taken along line 2-2 of FIG. 1;

FIG. 2b is a modification of FIG. 2a in which a coaxial transmission line of the detection/communication system of FIG. 1 is placed in tangential contact with the buried pipeline;

FIG. 3 is an elevational view, partially cut away, of the coaxial transmission line of FIGS. 2a and 2b;

FIG. 4 is an oscillogram as displayed by the leak-detection system of FIG. 1 illustrating reflection signal strength as a function of time;

FIG. 5 is a partially schematic, detailed lock diagram of a modification of the leak detection system of FIG. 1; and FIG. 6 is an elevational view, partially cut away, of a rectangular transmission line useful in the system of FIG. 5.

Referring now to FIG. 1, there is shown a hollow pipeline 10 buried in trench 11 at a depth d below surface 12, in earth formation 13. Within the pipeline 10, liquids such as oil or oil byproducts are conveyed from a pumping station to a discharge station (not shown) as in the direction of arrow 14. Between the pumping and discharge stations of the pipeline may be a series of stations (blockhouses) a, b and c as along the surface 12 of the earth formation 13. Stations a, b and c need not be located directly above axis of symmetry $A_1$ of the pipeline 10 but can be offset from a vertical plane through the axis $A_1$ varying lateral distances. Within each blockhouse a, b and c a variety of activities can be performed. For example, data related to pipeline pumping rates, physical properties of the pumped liquids, etc., can be collected, processed and relayed between stations. Or data can be collected, processed and relayed between stations which is totally unrelated to usual pipeline activities (i.e., payroll calculations, seismic data processing, engineering calculations, etc.)

Pipeline 10, as shown, includes a series of pipe sections 10a, 10b, 10c...10g welded together at a series of joints generally indicated at 16, 17, 18 and 19. After sections of pipeline have been joined and placed in trench 11, the unburied pipe sections are usually carefully inspected for flaws. However, after the trench has been backfilled and the pipeline placed in service, flaws may develop, such as at joints 17 and 18, due to corrosional effects. Liquid seeping from the flaws forms pools such as generally indicated at 21 and 22. It is apparent that pools 21 and 22 constitute operational, health and pollution hazards that must be detected as soon as possible. It is also apparent that a successful detection system should be capable of performing rapid and accurate inspection of relatively long lines of pipeline for flaws and of providing an accurate record of the occurrence of seepage from the pipeline as a function of actual pipeline length. A successful system should also have time-sharing capabilities related to data collection and processing functions such as can be carried out at blockhouse a, b or c, and for direct-line communication between the pumping and discharge terminals of the pipeline. Where the pumping and discharge terminals are located in remote regions of the world, such as in the permafrost regions of Alaska and Canada, the need for a direct-line communication system, in addition to usual radio systems, is readily apparent.

In accordance with the present invention, an electromagnetic pipeline detection—communication system is generally indicated at 25 in FIG. 1. System 25 includes a time-sharing coaxial transmission line 26 buried, in positional alignment with respect to the buried pipeline 10. Before pipeline 10 is placed within trench 11 (or at the surface 12 in case the pipeline 10 is laid over frozen land as found in Alaska), the coaxial transmission line 26 is buried at a depth $d_1$ below the intended depth $d$ of the pipeline 10. After the transmission line 26 and the pipeline 10 have been placed in trench 11 in tandem and the trench backfilled, vertically extending trunklines 27, 28 and 29 are connected at one end to the transmission line 26. The junction of the trunklines 27, 28 and 29 to the transmission line 26 are indicated at junctions 30, 31 and 32. A closed-loop radar system 33 positioned within each blockhouse a, b and c is attached at the other end of the trunklines 27, 28 and 29.

Radar system 33 operates in the closed-loop mode (closed-loop operation indicates direct linkage between the measuring as well as the monitoring system), and, as shown, includes time domain reflectometer 36 connected to transmission line 26 through a trunkline, say trunkline 27, to microwave switch 37. Time domain reflectometer 36 is conventional in design and, in operation, sends a step voltage from a point of known location through a sampler (not shown) into the transmission line 26. The conventional step voltage is generated by a voltage generator triggered by a time base (both not shown). Electromagnetic discontinuities in the transmission line 26 due to the intrusion of pipeline liquids therein, creating impedance mismatches along the line 26, as explained in detail below, are detected by measuring the magnitude of the reflected voltage at the reflectometer. Serially connected to the reflectometer is a high-speed sampling oscilloscope 38 triggered by the time base of the reflectometer 36. Since the voltage generator is preferably transistorized, a good impedance match with a low 50-ohm coaxial line can be achieved without the use of matching devices. The oscilloscope 38 is conventional in design and provides for display of reflections of the generated step voltages along the transmission line 26. The reflected voltage is indicated as a time profile at the display of the sampling oscilloscope 38.

Time domain reflectometer 36, useful in the method of the present invention, is conventional and can be purchased, for example, from the Hewlett-Packard Corp., Palo Alto, Calif. In such applications Hewlett-Packard time domain reflectometer Model No. TDR-1415-, for plug-in use with the Hewlett-Packard sampling oscilloscope Model No. 140A, is preferred. (See technical bulletin entitled "HP 140/141A Plug-In Oscilloscope," July 1967, Hewlett-Packard Corp., Palo Alto, Calif., at page 28.)

The vertical channel of the oscilloscope 38 is calibrated in reflection coefficients for direct readout of impedance mismatch (discontinuities) along the transmission line. No additional vertical or horizontal amplifiers are required. Cathode ray tube display area can be adjusted so as to give maximum resolution of reflected signals. For example, reflection coefficients as small as 0.001 can be observed, corresponding to a standing-wave ratio (SWR) of 1.002. (The standing-wave ratio is defined as the ratio of maximum to minimum field strength as the position along the transmission line is varied through a distance of at least one-half wavelength. Several ways of expressing this ratio have been used; usually the ratio of the field strength is expressed directly as a ratio greater than unity; similarly, the reflection coefficient is usually defined as the ratio of the maximum to minimum field strength of the two traveling waves (incident and reflected) traveling along the transmission line. See Microwave Transmission Design Data, T. Moreno (1948), Dover Publications, Inc., New York, N.Y., at page 20.

Distance can be read directly on the horizontal axis of the oscilloscope 38. Distance/time scale on the horizontal axis is calibrated to relate cathode ray tube horizontal length to the actual pipeline length being monitored.

Connected in parallel to radar system 33 is transceiver 39 employed to be alternatively connected to the transmission line 26 by selective operation of microwave switch 37. The transceiver 39 is of conventional design having transmitter and receiver circuits and includes, in its receiver circuit, a meter 40 suitable to indicate variations in amplitude of signals received at the transceiver. When radar system 33 is not in use, the transceiver 39 can utilize, on a time-sharing basis, the aforementioned transmission line 26. In this way the transceiver 39 can provide a direct-line communications link between various stations along the pipeline, say between a transmitter within blockhouse a and a b in blockhouse b over a preselected time interval. Direct line communications between the pumping and discharge station of the pipeline can also be maintained. In order that an operator along the pipeline 10, say at stations a and b, can be aware immediately of the likelihood of intrusions of fluid from flaws in the pipeline 10, meter 40 is, preferably, constantly monitoring the level of signals transmitted from one transceiver and received at another transceiver. Meter 40 indicates any decrease in the amplitude of the signal generated at an adjacent receiver due to losses in the transmission line connecting the transmitting and receiving transceivers of the adjacent stations. Thus, after entry of the liquid from pipeline 10 into the transmission line 26, reflection losses along the transmission line (caused by impedance mismatches at the point of liquid intrusion) abruptly increase the standing-wave ratio along the line and, correspondingly, decrease the amplitude of the received signal. Such a decrease (below, say, a threshold level) can be used to actuate a sound generator such as a horn, bell, siren, etc., through actuation of a relay circuit connected to the sound generator. When deterioration of signal strength becomes an actuality, the operator is put on notice of the possibility that leakage, of liquid, from the pipeline 10 has occurred. Consequently, radar system 33 can be switched into operative connection by actuation of microwave switch 37. Such operation of the switches 37 automatically disconnects the transceiver from contact with the transmission line.

FIG. 2a illustrates the location of the transmission line 26 with respect to pipeline 10. As shown, the depth $d_1$ of the transmission line 26 (to its axis of symmetry $A_2$) is greater than the magnitude of the combination of the depth $d$ of the pipeline 10 (at its axis $A_1$) below the surface 12 and outside radius R of the pipeline. Thus, although the axes $A_1$ and $A_2$ of the pipeline and the transmission line, respectively, can be aligned in a common vertical plane, their outer surfaces are not in touching contact but are spaced apart by the incremental distance $d_2$ where $d_2 = d_1 - (d+R) - r$ where $r$ is equal to the outside radius of the transmission line 26.

However, the pipeline and the coaxial line can be located so that respective outer surfaces are placed in tangential contact as shown in FIG. 2b. In usual applications, the trench 11 is backfilled with soil of the original formation which, when compacted, may be rather impermeable. Thus, by placing the transmission line 26' at a distance $d_1'$ below surface 12 (as measured from its axis of symmetry $A_2'$) so that its outer surface is in tangential contact with the outer surface of the pipeline 10', detection of leakage of the fluid from flaws within the pipeline 10' can be enhanced. In the arrangement, the pipeline 10' is positioned at a distance $d'$ below surface 12 as measured from its axis of symmetry $A_1'$; thus, the depth of the transmission line $d_1'$ is equal to $d' + R' + r'$ where $R'$ is the outside radius of the pipeline 10' and $r'$ is the outside radius of the transmission line 26.

FIG. 3 is a side elevation, partially cut away, of a section of transmission line 26. As shown, transmission line 26 includes a stranded or solid, cylindrical conductor 41 surrounded by a coextending helical outer conductor 42 having a senses of turns 42a. The center conductor 41 is maintained in fixed position along central axis of symmetry $A_2$ by means of cylindrical, annular insulating spacers 43 periodically spaced therealong. Spacers 43 also aid in establishing an insulating air barrier between central conductor 41 and outer conductor 42. In turn, outer covering, or sheath 44 of insulating material is placed in tangential contact with the outer conductor 42. The impedance and electrical length of the coaxial line is controlled so that the impedance per unit length is a fixed value, say 50 ohms per unit length.

Outer covering 44 must allow intrusion of the liquid (being conveyed within the pipeline) so that the liquid can penetrate cavity 49 between the outer conductor 42 and the inner conductor 41 and create an abrupt change in impedance along the line 26. In that way electromagnetic energy propagated along the coaxial transmission line 26 is reflected from the area of the intruded liquid back to a sensing element to indicate the presence of foreign matter within the transmission line. Not only should the outer covering 44 allow intrusion of liquid from the pipeline but it also should exclude all other liquids commonly found within near-surface earth formations, such as ground water. In this regard, if the liquid within the pipeline 10 is oil or an oil product, outer covering 44 can be formed of asphalt materials, wax-based compositions, rubber-based (oil-soluble) compositions or synthetic (oil-soluble) polymers. These materials are soluble within oil or oil byproducts but are impervious to water. Accordingly, until the outer covering 44 has been penetrated by oil or an oil product, the outer covering 44 remains unflawed and impervious to ground water. The outer covering may be applied in many different ways. For example, the above materials may be applied by conventional means as a continuous, uniform coating. Alternatively, the outer covering may be applied in the form of an adhesive tape which is composed of a fabric or oil-soluble backing material and an oil-soluble adhesive or gum.

It should also be evident that when the outer cover 44 is intended for use in permafrost regions, additional types of materials can be employed for forming the outer covering. Permafrost regions, by definition, are land regions which have remained below 0° C. for many years. Thus, if the transmission line 26 is placed within a region that is truly a permafrost zone (i.e., the region remains below 0° C.), there is little likelihood that ground water can penetrate the outer covering. Therefore, the materials comprising the outer covering need not be impervious to water. Accordingly, in addition to the materials previously mentioned, covering 44 could also be formed of cellulose, carbowax or guar gum materials. A further advantage of using a transmission line not impervious to water would be to indicate a temperature change along the monitored pipeline. In Alaska, "muskeg" areas are defined as areas in the earth's surface which, during the summer months, have temperatures above 0° C. At such temperatures, thawing of the ice within the near surface occurs. Should the pipeline 10 be supported at the surface of such " muskeg" areas, there is a possibility that rigid support of the pipeline may no longer be possible as thawing occurs. Thus, if the transmission line is not impervious to water, water entry into the transmission line can be detected simultaneously as the transmission line is monitored for intrusion of liquid conveyed in the adjacent pipeline. In that way, the operator of the pipeline has been warned of the possibility that the support structure of the pipeline may be inadequate.

For application in "muskeg" areas it may be advantageous to employ outer coverings which are specially made to be easily penetrated by both water and the liquid being transported within the pipeline. These special coverings could be made of, for example, emulsifiable wax or asphaltic materials, conglomerate mixtures of water-soluble crystals or gels and oil-soluble materials, or tapes made of oil-soluble backing material and water-soluble adhesive. A further example would consist of covering the transmission line with alternate spiral wraps of oil-soluble tape and water-soluble tape.

FIG. 4 is an oscillogram, generally indicated at 45, of the oscilloscope 38 of FIG. 1 indicating, by cathode ray tube (CRT) display, reflections of electromagnetic energy from pipeline liquids that have seeped into transmission line 26. Electromagnetic discontinuities in the transmission line 26 are indicated by response spikes 46a, 46b and 46c. The oscillogram can be permanently recorded by photographing the CRT display using a camera, or can be permanently recorded using a conventional X—Y recorder connected to the output of the oscilloscope 38. The vertical channel of the oscilloscope 38 is usually calibrated in terms of reflection coefficients, the threshold level being established to detect intrusions of a particular liquid conveyed in the pipeline 10 of FIG. 1 into the transmission line 26. In this regard, it should be evident that any transmission line may have reflection discontinuities associated with it. For example, even a conventional coaxial component such as a connector will create some impedance mismatch with respect to the line. However, only when the magnitude of the discontinuity is above a selected threshold level will the oscilloscope 38 be actuated. It has been found that if the liquid within the pipeline 10 is an oil or petroleum product, rather high reflection coefficients will be present along the transmission line 26. It can be appreciated that the grid lines a, b...k of the oscillogram 45 directly relate to the distance separating the discontinuities relative to the geometric position of the oscilloscope. Below threshold, the signal output of the oscilloscope is displayed as a flat horizontal line 47. Further, the CRT display of the oscilloscope can be calibrated to represent many magnitudes of actual length of pipeline. The distance/horizontal scale of the oscilloscope is calibrated along axis 48 of FIG. 4 to relate horizontal dimensions of the CRT display to the actual dimensions separating discontinuities along the transmission line 26 with respect to the actual known position of the reflectometer.

Higher frequency systems can also be used in the method of the present invention in order to increase the resolution of the reflectometer system. In this regard it should be understood that the transmission line of the present invention supports travel of two traveling waves. An incident traveling wave travels down the line and is reflected in part from discontinuities therealong when it encounters an impedance other than the impedance of the line which it travels. Standing waves are then set up on the line on the input side of the reflecting impedance. The magnitude and phase of the reflecting will depend upon the amplitude and phase of the reflecting impedance. The reflected wave on a transmission line may be considered as the fraction of the incident wave that is reflected from the load impedance and carries that fraction of power not absorbed by the load impedance from the incident wave. In high frequency systems, the reflectometer can be a more conventional closed-loop radar system operating in either the time or frequency domain and including a conventional generator/modulator connected to a compatible transmission line through a switching duplexer. A receiver is connected in series with the duplexer to detect reflections from discontinuities along the transmission line. Since the pulse width a can be reduced, resolution of reflections from closely adjacent discontinuities is increased. Display of the reflections can be in conventional manner using an oscilloscope similar to that illustrated in FIGS. 1 and 4.

FIG. 5 illustrates a modified form of a high-frequency reflectometer system. In the FIG., the time domain reflectometer 50 includes a pulse generator 51 for generating a pulse signal. Generator 51 is triggered by means of a synchronizing signal from a conventional time base 52 connected to and triggering sampling oscilloscope 53. In operation, a pulse of high frequency electromagnetic energy is driven through a high-frequency trigger countdown 58 and sampler 55 into the buried rectangular waveguide 54 through switch 56, such as a ferromagnetically controlled Magic Tee, and propagates along the guide adjacent to the buried pipeline. As the energy strikes the discontinuities (marking intrusions of pipeline liquid), signals are reflected back through the sampler 55 through a vertical amplifier 57 and thence to oscilloscope 53. The resulting reflections are displayed on the oscilloscope producing an amplitude-versus-time oscillogram.

It has been found that high frequency reflectometer system having the following components is of particular utility in the frequency range of 1 to 12.4 GHz.:

| Component | Hewlett-Packard Model No. |
| --- | --- |
| Oscilloscope 53 | 140A |
| Time Base 52 | 1425A |
| Vertical Amplifier 57 | 1411A |
| Sampler 55 | 1430A |
| Fast Rise Pulser 51 | 1105—1106A |
| Trigger Countdown 58 | 1104A—1106A |

Resolution of the above-described reflectometer system can be as high as 1 cm. per unit length of transmission line. Reflection coefficient sensitivity to 0.002 per cm. of transmission line can also be observed (see technical bulletin entitled, "HP 140A/141 Plug-in Oscilloscope," July 1967, Hewlett-Packard Corp. Palo Alto, Calif. at page 22).

Similarly, it has been found that a reflectometer system having the following identification can also be used: cable Fault Locator Model 110A, Jerrold Electronics Corp., Government and Industrial Division, 401 Walnut St., Philadelphia, Pa.

FIG. 6 illustrates rectangular waveguide 54 in more detail. As shown, waveguide 54 is of rectangular cross section and includes metallic sidewalls 59 and 60 connected, at ends, to metallic broad walls 61 and 62. Sidewalls 59 and 60 as well as broad walls 61 and 62 are perforated with a series of openings generally indicated at 63. An outer covering, sheath, 64 of insulating material is placed in contact with the exterior surfaces of walls 59, 60, 61 and 62 of the waveguide. Dimensions of the side and broad walls of the waveguide are selected to propagate high-frequency electromagnetic energy. As previously discussed, the outer covering 64 must have the capability to allow intrusion of a liquid from the pipeline to be monitored therethrough. In that way the liquid can penetrate the cavity 65 at the axis of symmetry 66 of the waveguide and create an abrupt change in the transmission characteristic of the waveguide. In order that the outer covering 64 allow intrusion of the liquid from the pipeline but exclude all other liquids commonly found within near-surface earth formation, the material forming the covering must be carefully selected. In this regard, as previously mentioned, outer covering 64 can be formed of asphalt materials, wax-based compositions, rubber-based (oil-soluble) compositions or synthetic (oil-soluble) polymers if the liquid within the pipeline is an oil or oil product. Further, if the waveguide is used in the permafrost regions of the world, the covering can also be formed of cellulose, carbowax or guar gum materials.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:
1. The method of forming a pipeline and communication line link which consists of the steps of:
  1. laying a pipeline and electromagnetic transmission line together in tandem relationship as between pumping and discharge stations, said transmission line having an electrically insulating outer covering formed of a material soluble in a liquid to be conveyed in said pipeline and conducting means for propagating electromagnetic energy along said transmission line,
  2. connecting said pipeline, at one end, to a source of said liquid, and, at the other end, connecting said pipeline to a discharge terminal,
  3. selectively connecting said conducting means of said transmission line to one of (a) an electromagnetic reflec- tometer system and (b) a direct-line, two-way communication system, so that when said transmission line is connected to said reflectometer system seepage of said liquid from said pipeline through flaws in said pipeline into positions within said transmission line can be indicated and identified by measuring the two-way travel time of electromagnetic energy to and from said positions of said seepage in said transmission line and when said transmission line is connected, in direct line linkage, to said communication system, information can e conveyed from location along said transmission line.

2. Method of claim 1 in which the step of laying said pipeline and said electromagnetic transmission line, is further characterized by locating said transmission line at a depth below said pipeline.

3. The method of claim 2 in which the step of locating said transmission line below said pipeline includes laying said transmission line in tangential contact with said pipeline.

4. The method in accordance with claim 1 with the additional step of monitoring signal amplitude when said conducting means of said transmission line is connected to said communication system so as to initially indicate deterioration in signal level along said transmission line.

5. The method of claim 1 in which said pipeline and said transmission line are buried in an earth formation of a permafrost region, said electrically insulating covering means of said transmission line being composed of a material soluble both in said liquid to be conveyed in said pipeline and in water.

6. The method of locating flaws in a buried, hollow pipeline using a time-sharing transmission line, which comprises the steps of:
 a. positioning adjacent to said pipeline, a transmission line having conducting means and electrically insulating covering means soluble in a liquid to be conveyed in said pipeline and located exterior of said conducting means, said conducting means being capable of propagating electromagnetic energy therealong and to indicate, by measurement of the two-way travel time of generated and reflected energy, locations of electromagnetic discontinuities along said transmission line from a known point, said transmission line being positioned so that said liquid being conveyed in said pipeline and seeping from flaws in said pipeline can enter into said transmission line through said covering means, into contact with said conducting means,
 b. Generating and receiving along said transmission line, incident and reflected electromagnetic signals by means of at least first and second electromagnetic generating and receiving systems directly connected to said conducting means of said transmission line, each system having at least a transmitter and a receiver,
 c. utilizing, over a first preselected time interval, said reflected electromagnetic signals to indicate the condition of said pipeline as to the presence and absence of flaws therealong, the magnitude of said reflected signals above a selected threshold level indicating the occurrence of leakage of said liquid from said pipeline, and
 d. thereafter utilizing, over a second time interval, said incident electromagnetic signals conveying meaningful information from a transmitter of one of said first and second electromagnetic generating and receiving systems to a receiver of the other of said first and second electromagnetic generating and receiving systems, thereby providing direct-line communication between said first and second generating and receiving systems.

7. The method in accordance with claim 6 in which the step of utilizing said reflected electromagnetic signals, over said first time interval, includes the substep of monitoring an electrical characteristic of said reflected energy whereby the magnitude of said characteristic above a selected threshold level indicates the existence of said liquid within said transmission line and hence the occurrence of leakage from said pipeline of said liquid.

8. The method in accordance with claim 7 including the substep of monitoring the two-way travel time between generated and reflected electromagnetic signals of one of said first and second generating and receiving systems so as to pinpoint the distance between said liquid within said transmission line and a point of known location along said transmission line at which said one of said first and second generating and receiving systems is positioned.

9. The method in accordance with claim 7 in which said substep of monitoring said electrical characteristic is further characterized by selectively indicating only reflected signals proportional to a selected reflection coefficient greater than a threshold reflection coefficient, said threshold reflection coefficient being selected whereby the magnitude thereof indicates intrusions of said liquid from said pipeline into said transmission line.